US012811083B2

(12) United States Patent
Dieken

(10) Patent No.: US 12,811,083 B2
(45) Date of Patent: Nov. 24, 2026

(54) GENERATOR SET SYSTEM WITH CIRCUIT BREAKER CABINET

(71) Applicant: Rolls-Royce Solutions GmbH, Friedrichshafen (DE)

(72) Inventor: Conrad Dieken, Mankato, MN (US)

(73) Assignee: Rolls-Royce Solutions GmbH, Friedrichshafen (DE)

( * ) Notice: Subject to any disclaimer, the term of this patent is extended or adjusted under 35 U.S.C. 154(b) by 862 days.

(21) Appl. No.: 18/097,433

(22) Filed: Jan. 16, 2023

(65) Prior Publication Data

US 2024/0242909 A1 Jul. 18, 2024

(51) Int. Cl.
*H01H 71/02* (2006.01)
*H02B 1/32* (2006.01)

(52) U.S. Cl.
CPC ............. *H01H 71/025* (2013.01); *H02B 1/32* (2013.01)

(58) Field of Classification Search
CPC .......... H02G 3/08; H02G 3/081; H02G 3/086; H01H 71/025; H01H 71/02; H01H 71/0207; H02B 1/32; H02B 1/30; H02B 1/20; H02B 1/21; H02B 1/126; H02B 1/305; H02B 1/306; H02B 1/26; F02B 63/04
USPC ............. 174/50, 59, 520, 17 R; 220/3.2–3.9, 220/4.02; 248/906; 361/600, 601, 635, 361/640, 622
See application file for complete search history.

(56) References Cited

U.S. PATENT DOCUMENTS 8,027,154 B2 * 9/2011 Gatti ........................ H02B 3/00 361/636
8,254,089 B2 * 8/2012 Cosley ..................... H02B 1/32 361/640
8,514,551 B2 * 8/2013 Cosley ..................... H02B 1/32 361/635
8,559,167 B1 * 10/2013 Czarnecki ................ H02B 1/46 174/50
8,867,234 B2 * 10/2014 Heimann ............... H04Q 1/025 174/520

(Continued)

FOREIGN PATENT DOCUMENTS

CN 108 539 845 A 9/2018
CN 211 183 270 U 8/2020

(Continued)

OTHER PUBLICATIONS

"Generator Quick Connect", Eaton/Cutler-Hammer, taken from https://www.eaton.com/content/dam/eaton/products/lowvoltage-power-distribution-controls-systems/switchboards/eatongenerator-quick-connect-product-aids-pa01510002k-ca.pdf, May 1, 2024 (62 pages).

(Continued)

*Primary Examiner* — Angel R Estrada
(74) *Attorney, Agent, or Firm* — TAYLOR & EDELSTEIN, PC

(57) ABSTRACT

A generator set system includes: a support apparatus; a circuit breaker cabinet coupled with the support apparatus, the circuit breaker cabinet including: a housing including a first region and a second region which is spatially separated from the first region; a circuit breaker device coupled with the housing, being within the first region, and including a front end with a user interface; and an electrical connector apparatus coupled with the housing, being within the second region, and including a front end with a user interface.

18 Claims, 7 Drawing Sheets

(56) References Cited

U.S. PATENT DOCUMENTS

| | | | | | |
|---|---|---|---|---|---|
| 8,902,570 | B2 * | 12/2014 | Cosley | H02B 1/42 | |
| | | | | 361/635 | |
| 11,316,366 | B2 * | 4/2022 | Sunde | H02B 1/32 | |
| 11,641,093 | B2 * | 5/2023 | Irwin | H02B 1/30 | |
| | | | | 361/622 | |

FOREIGN PATENT DOCUMENTS

| | | | |
|---|---|---|---|
| CN | 213 425 530 | U | 6/2021 |
| CN | 214 542 992 | U | 10/2021 |
| DE | 100 21 275 | A1 | 10/2001 |

OTHER PUBLICATIONS

Notification of Transmittal of the International Search Repo9rt and the Written Opinion of the International Searching Authority, or the Declaration dated May 16, 2024 for International Application No. PCT/IB2024/000030 (62 pages).

* cited by examiner

GENERATOR SET SYSTEM WITH CIRCUIT BREAKER CABINET

BACKGROUND OF THE INVENTION

1. Field of the Invention

The present invention relates to generator set systems, and, more particularly, to circuit breaker cabinets of generator set systems.

2. Description of the Related Art

A generator set system (also known as a genset system) is known to include an engine and a generator. The engine produces mechanical energy, and the generator converts the mechanical energy produced by the engine into electrical energy, which is used to power one or more other electrically powered devices, the electrical load.

The genset system can also include a circuit breaker electrically coupled between the generator and the electrical load. This circuit breaker can be a part of a circuit breaker cabinet, which forms a part of the genset system. The circuit breaker cabinet can help to facilitate the electrical coupling of the circuit breaker with upstream (power supply side) and downstream (electrical load side) electrical conductors.

A problem exists with current circuit breaker cabinets. A user may be able to readily interface with a front end (which includes a face that faces forward) of the circuit breaker. However, for example, the circuit breaker face and quick coupling cable receptacles provisions were historically only able to be realized on opposite sides of the circuit breaker cabinet.

What is needed in the art is easier access to at least one way for electrically coupling an electrical device which is external to the circuit breaker cabinet.

SUMMARY OF THE INVENTION

The present invention provides a circuit breaker cabinet including a circuit breaker device and an electrical connector apparatus which is spaced apart from the circuit breaker device and includes a front end with a user interface.

The invention in one form is directed to a generator set system, including: a support apparatus; a circuit breaker cabinet coupled with the support apparatus, the circuit breaker cabinet including: a housing including a first region and a second region which is spatially separated from the first region; a circuit breaker device coupled with the housing, being within the first region, and including a front end with a user interface; and an electrical connector apparatus coupled with the housing, being within the second region, and including a front end with a user interface.

The invention in another form is directed to a circuit breaker cabinet for a generator set system, the generator set system including a support apparatus, the circuit breaker cabinet being coupled with the support apparatus, the circuit breaker cabinet including: a housing including a first region and a second region which is spatially separated from the first region; a circuit breaker device coupled with the housing, being within the first region, and including a front end with a user interface; and an electrical connector apparatus coupled with the housing, being within the second region, and including a front end with a user interface.

The invention in yet another form is directed to a method of using a generator set system, the method including the steps of: providing a support apparatus and a circuit breaker cabinet coupled with the support apparatus, the circuit breaker cabinet including a housing, a circuit breaker device, and an electrical connector apparatus, the housing including a first region and a second region which is spatially separated from the first region; coupling the circuit breaker device with the housing, the circuit breaker device being within the first region and including a front end with a user interface; and coupling the electrical connector apparatus with the housing, the electrical connector apparatus being within the second region and including a front end with a user interface.

An advantage of the present invention is that it provides a universal low voltage 3000 A-4000 A 3-phase AC (alternating current) circuit breaker cabinet (the circuit breaker being OEM agnostic) with integrated quick coupling cable receptacle provisions for temporary generator or temporary load bank connection.

Another advantage of the present invention is that both the circuit breaker and the electrical connector apparatus (which includes the integrated quick coupling receptacle provisions) are readily accessible from the front of the circuit breaker cabinet by a user. This is important when looking at standard interface points and overall manufacturability with respect to including the circuit breaker cabinet as a genset baseframe mounted and wired option.

Yet another advantage of the present invention is that it overcomes the problem concerning the circuit breaker cabinet profile (that is, the layout) not being able to accommodate circuit breakers—such as those in 3,000 A-4,000 A sizes—made by manufacturers (namely, original equipment manufacturers (OEMs)) other than the manufacturer who also makes the circuit breaker cabinet. Thus, the present invention provides for a circuit breaker cabinet which has a profile which is common or universal for circuit breakers (for example, of the aforementioned sized range) made by OEMs which do not also make the circuit breaker cabinet. Thus, the present invention makes it feasible for the circuit breaker cabinet to be integrated behind the genset on a common baseframe of the genset system with minimal clearances.

Yet another advantage of the present invention is that it can be employed in a variety of applications, including, but not limited to, data center applications.

Yet another advantage of the present invention is that the circuit breaker cabinet can be used in high or low voltage applications, wherein low voltage can be understood to be less than 500 volts AC.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
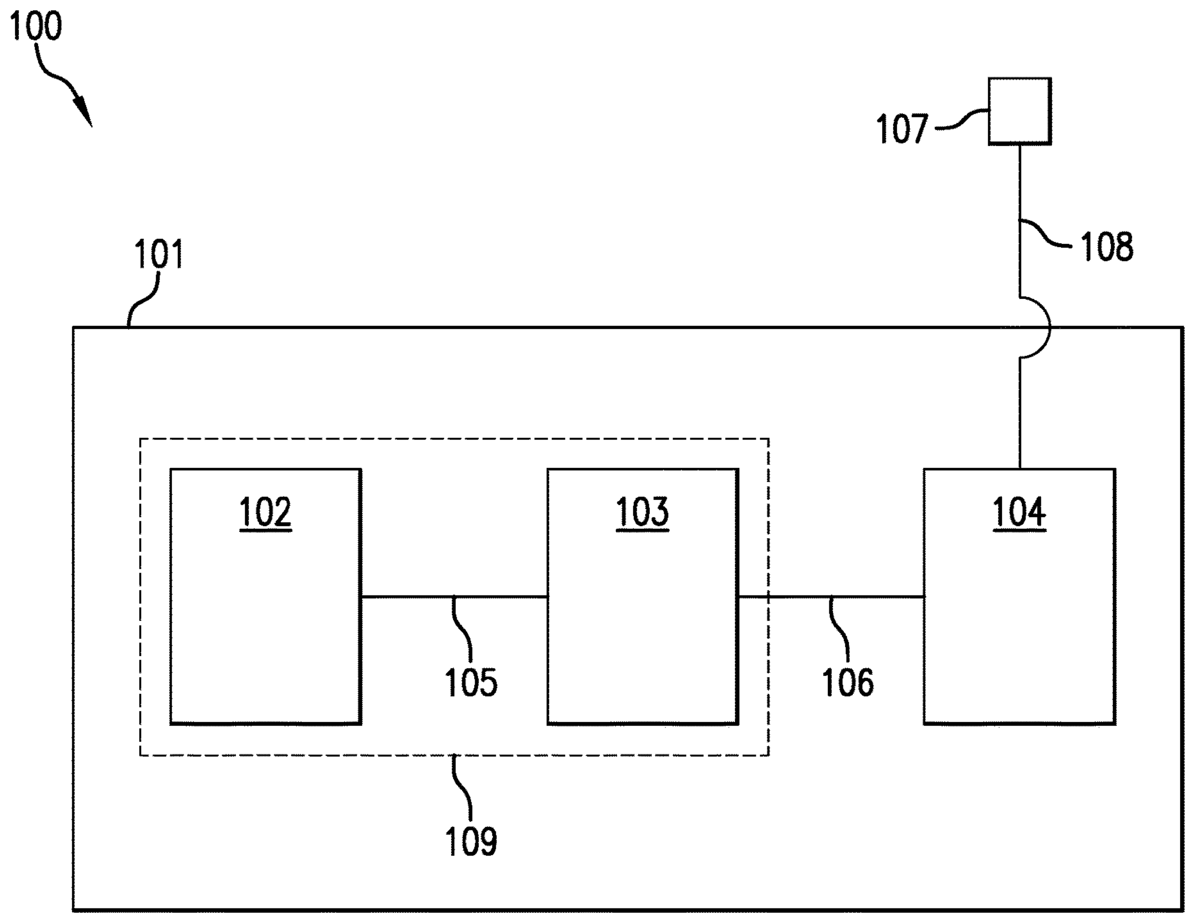
FIG. 1 is a schematic illustration of a generator set system, including a support apparatus, a generator, and a circuit breaker cabinet, in accordance with an exemplary embodiment of the present invention.

Referring now to the drawings, and more particularly to FIG. 1, there is shown schematically a generator set system 100 (which can also be referred to herein as genset system 100), which generally includes a support apparatus 101, an engine 102, a generator 103, a circuit breaker cabinet 104, a mechanical coupling 105 mechanically connecting engine 102 and generator 103, and electrical coupling 106 electrically coupling generator 103 and circuit breaker cabinet 104. Box 109 is the generator set 109 (which can also be referred to as genset 109), including engine 102 and generator 103, genset 109 being part of genset system 100, as indicated in FIG. 1. Though cabinet 104 is not shown within box 109, it can optionally be understood that cabinet 104 is part of genset 109. Further, though not necessarily a part of genset system 100, FIG. 1 also shows electrical load 107, which is electrically coupled with cabinet 104 by way of electrical connection 108. Support apparatus 101 can be any sort of housing, frame, enclosure, platform, and/or the like which is configured for supporting and/or coupling with all other elements of genset system 100. Support apparatus 101 can be configured such that genset system 100 has a box-like configuration. Engine 102 can be any device configured for outputting mechanical energy, including but not limited to a device powered by diesel fuel or natural gas. Generator 103 can be any device configured for converting the mechanical energy from engine 102 to electrical energy. Generator 103 can be selectively electrically coupled with the circuit breaker cabinet 104. Circuit breaker cabinet 104, discussed further below, is configured for, among other things, opening an electrical circuit between generator 103 and electrical load 107, as is known. Electrical load 107 can be any device(s) configured for receiving and consuming electrical energy from generator 103. For example and not by way of limitation, genset system 100 can be a part of, or otherwise coupled with, a building, such as a data center, so as to provide all or part of the electrical power needed by one, more, or all of the devices within the building. According to an embodiment of the present invention, genset system 100 can be a modular device.

Figure 2:
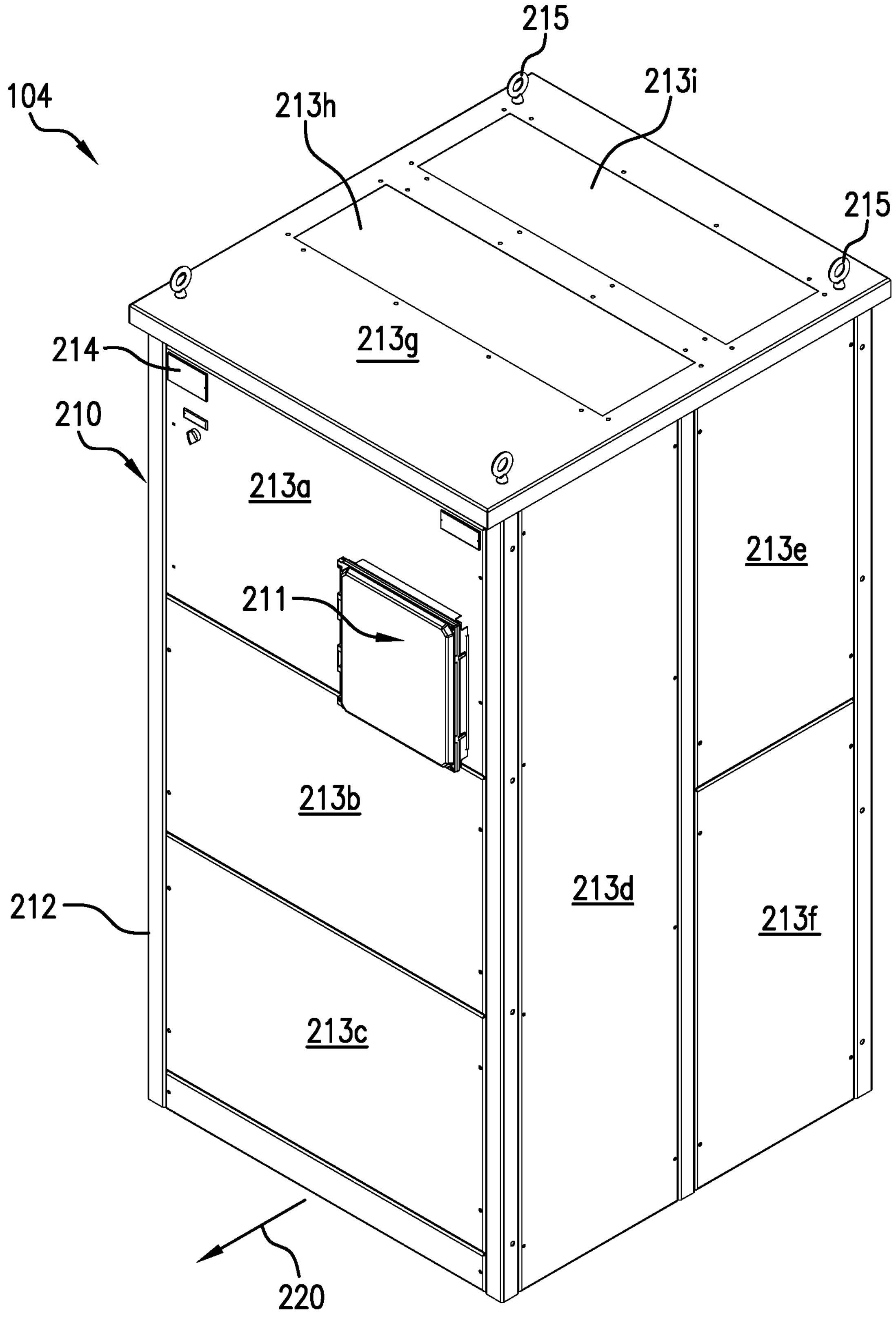
FIG. 2 is a perspective view of the circuit breaker cabinet of FIG. 1, in accordance with an exemplary embodiment of the present invention.
Figure 6:
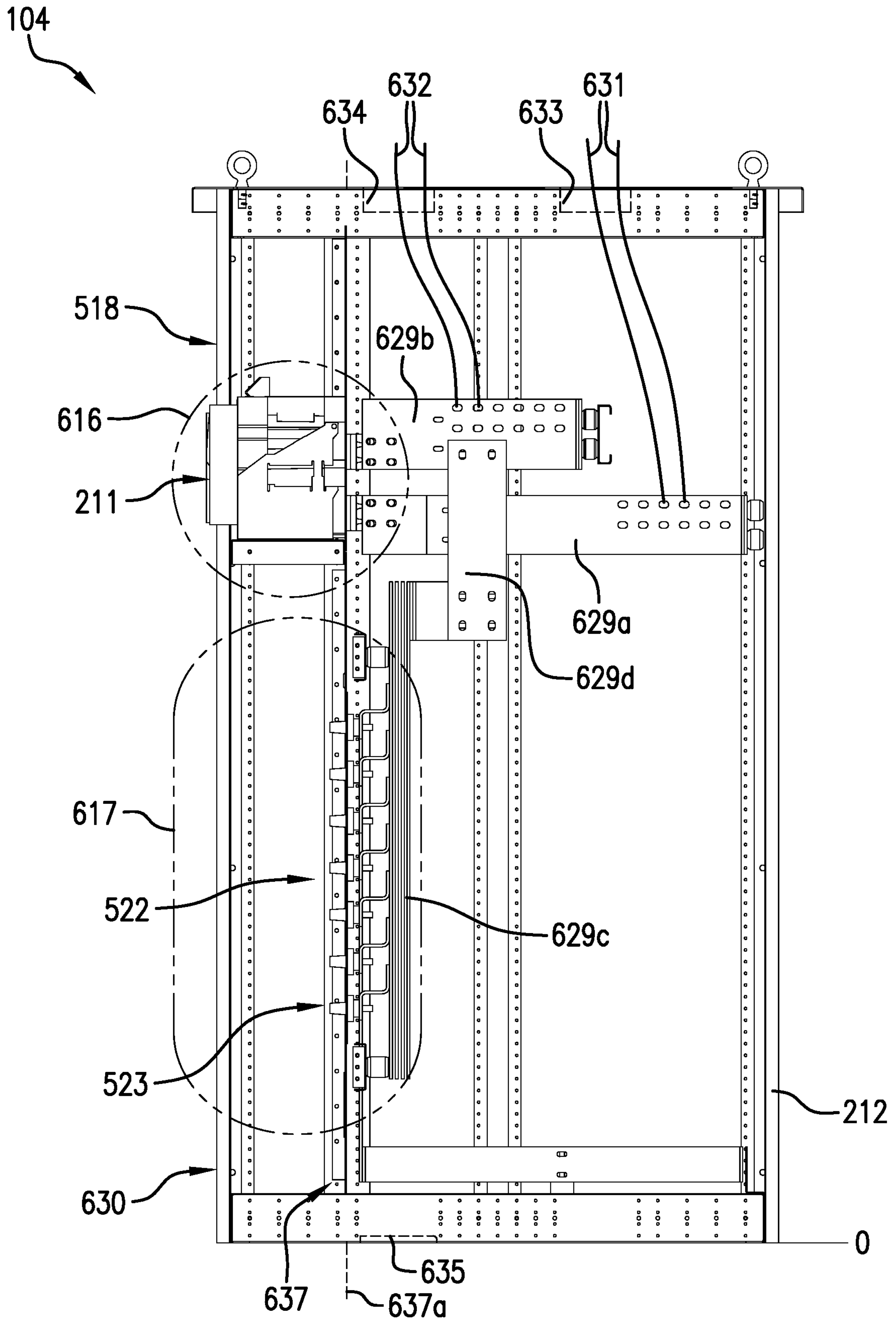
FIG. 6 is a right side cross-sectional view of the circuit breaker device of FIG. 1 taken along line 6-6 of FIG. 5, in accordance with an exemplary embodiment of the present invention.

Referring now to FIG. 2, there is shown a perspective view of circuit breaker cabinet 104. As shown in FIG. 2, cabinet 104 includes a housing 210 and a circuit breaker device 211 coupled with housing 210. Housing 210 includes a frame 212 configured for supporting the other structures of cabinet 104. Housing 210 further includes panels—such as panels 213*a-i*—coupled with frame 212, panels 213*a-i* forming at least portions of an outside skin or walls of housing 210 and thus of cabinet 104 (optionally, one or more of panels 213*a-i* may be omitted, in accordance with an alternative embodiment of the present invention). Panels 213*a-i* can be made of any suitable material and be made in any suitable manner. Panel 213*a* can form a hinged door or a removable cover (which can be attached by way of fasteners) and can include indicia (such as indicia 214) in one or more places on an exterior surface of panel 213*a*. Panel 213*a* can be referred to as a control compartment door. Panels 213*a*, 213*b*, 213*c* can form, at least in part, a front wall of housing 210 and thus of cabinet 104. Panels 213*b*, 213*c* can form hinged doors or removable covers (which can be attached by way of fasteners). Panels 213*d*, 213*e*, and 213*f* can form, at least in part, a right wall of housing 210 and thus of cabinet 104 (panels 213*d*, 231*e*, 213*f* form in part a right side of cabinet 104, a left (opposite) side optionally being substantially identical to the right side). Panels 213*g*, 213*h*, 213*i* can form hinged doors or removable covers (which can be attached by way of fasteners) and can form, at least in part, a top wall of housing 210 and thus of cabinet 104. Panels 213*h*, 213*i* can, for example, cover similarly sized and shaped holes 634, 633, respectively, in panel 213*g* (FIG. 6). Holes 633, 634 can be configured for allowing passage respectively of a plurality of electrical conductors 631, 632 (which can be referred to as wires or cables) therethrough (FIG. 6)(holes 633, 634 can also be referred to as conductor routing channels or conductor mounting channels). For instance, conductors 631 passing through hole 633 can couple with generator 103, and conductors 632 passing through hole 634 can couple with electrical load 107. Thus, holes 633, 634 can be cut out at a factory during manufacturing of cabinet 104, and panels (covers) 213*h*, 213*i* can be temporarily installed to cover holes 633, 634 during shipping and until cabinet 104 is integrated into an overall system for use, such as genset system 100. According to an alternative embodiment of the present invention, a panel similar to panel 213*g* (this panel can optionally have, for example, less thickness (vertical height) than what is shown in FIG. 2 with respect to panel 213*g*) does not include holes 633, 634 or panels 213*h*, 213*i*; instead, this panel can be flat and formed as a top hat for cabinet 104 so as to removably cover the top of cabinet 104, and this panel (top hat) can be removably fastened to frame 212 (such as by way of any suitable fasteners, such as bolts or the like), wherein this panel (the top hat) can be removed from frame 212 so as to enable electrical conductors, such as conductors 631, 632 to enter cabinet 104 and connect with, for example, busbars 629*a*, 629*b*. Other ways exist as well for final cable entry (that is, for example, entry of electrical conductors 631, 632 into an interior space defined by housing 210).

Housing 210 can further include a plurality of lifting devices 215, such as four eye bolts 215, positioned at or near the four corners of panel 213*g*. Eye bolts 215 can be configured for enabling cabinet 104 to be lifted by a lifting mechanism. Further, housing 210 includes or otherwise defines a first region 616 and a second region 617 which is spatially separated from first region 616 (FIG. 6)).

Figure 5:
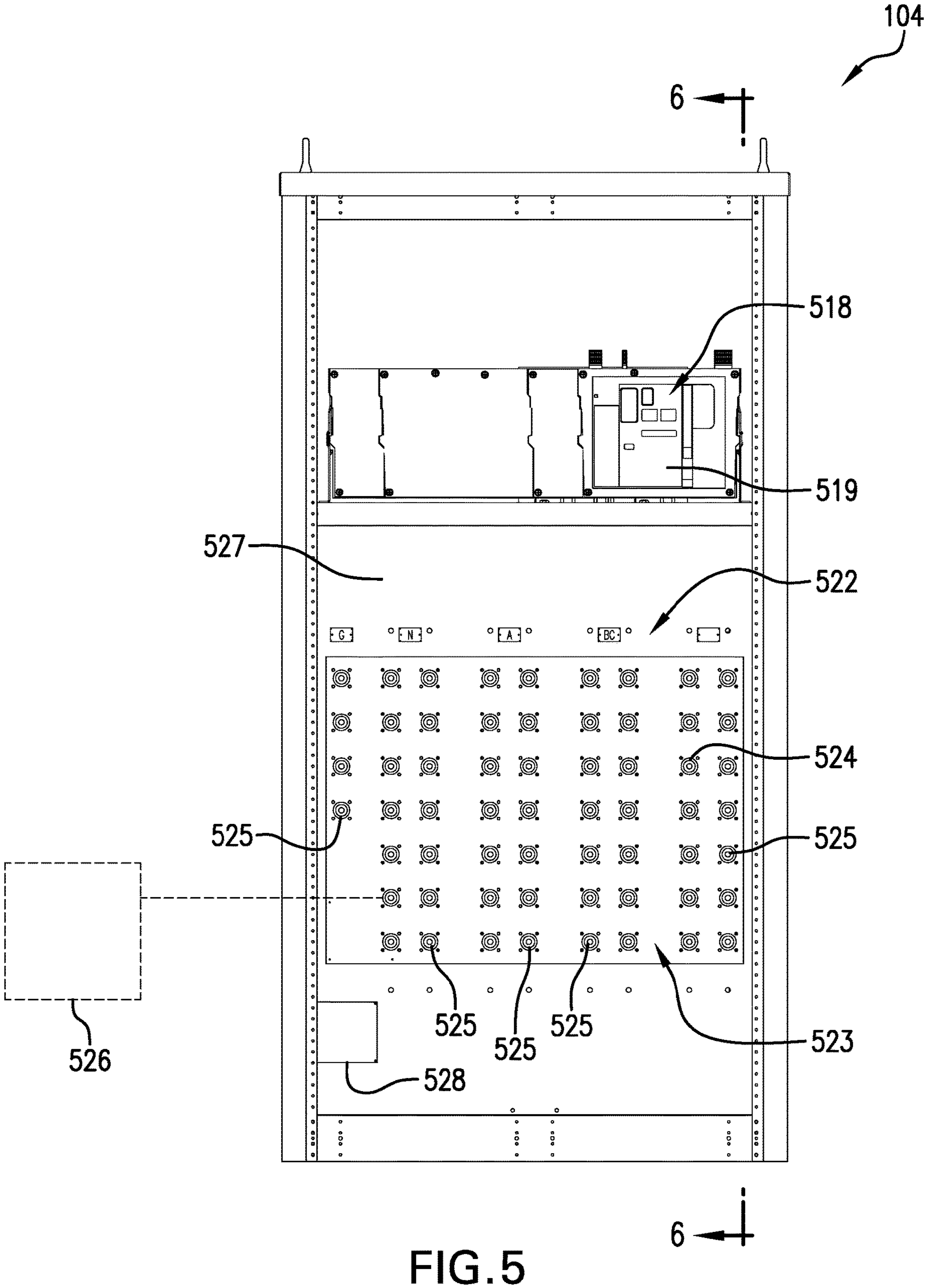
FIG. 5 is a front view of the circuit breaker device of FIG. 1, with portions broken away, in accordance with an exemplary embodiment of the present invention.

Circuit breaker device 211 is coupled with frame 212 by suitable fasteners. Circuit breaker device 211 can be any suitable circuit breaker device and can be configured for protecting, switching, and monitoring, as is known. For example and not by way of limitation, circuit breaker device 211 can have a size of 3,000 A-4,000 A. Further, circuit breaker device 211 is positioned within first region 616. Circuit breaker device 211 is, according to one embodiment of the present invention, positioned so as to at least partially extend through a hole (window) in panel 213*a*, or, alternatively, according to another embodiment of the present invention, circuit breaker device 211 can be positioned entirely behind panel 213 when panel 213*a* is closed. Circuit breaker device 211 can include a front end cover or face cover (as indicated in FIGS. 1 and 2), which can be hinged with panel 213*a* and which can be selectively opened and closed so that a user can access a user interface 519 (FIG. 5). Further, cabinet 104 includes a forward direction 220.

Figure 3:
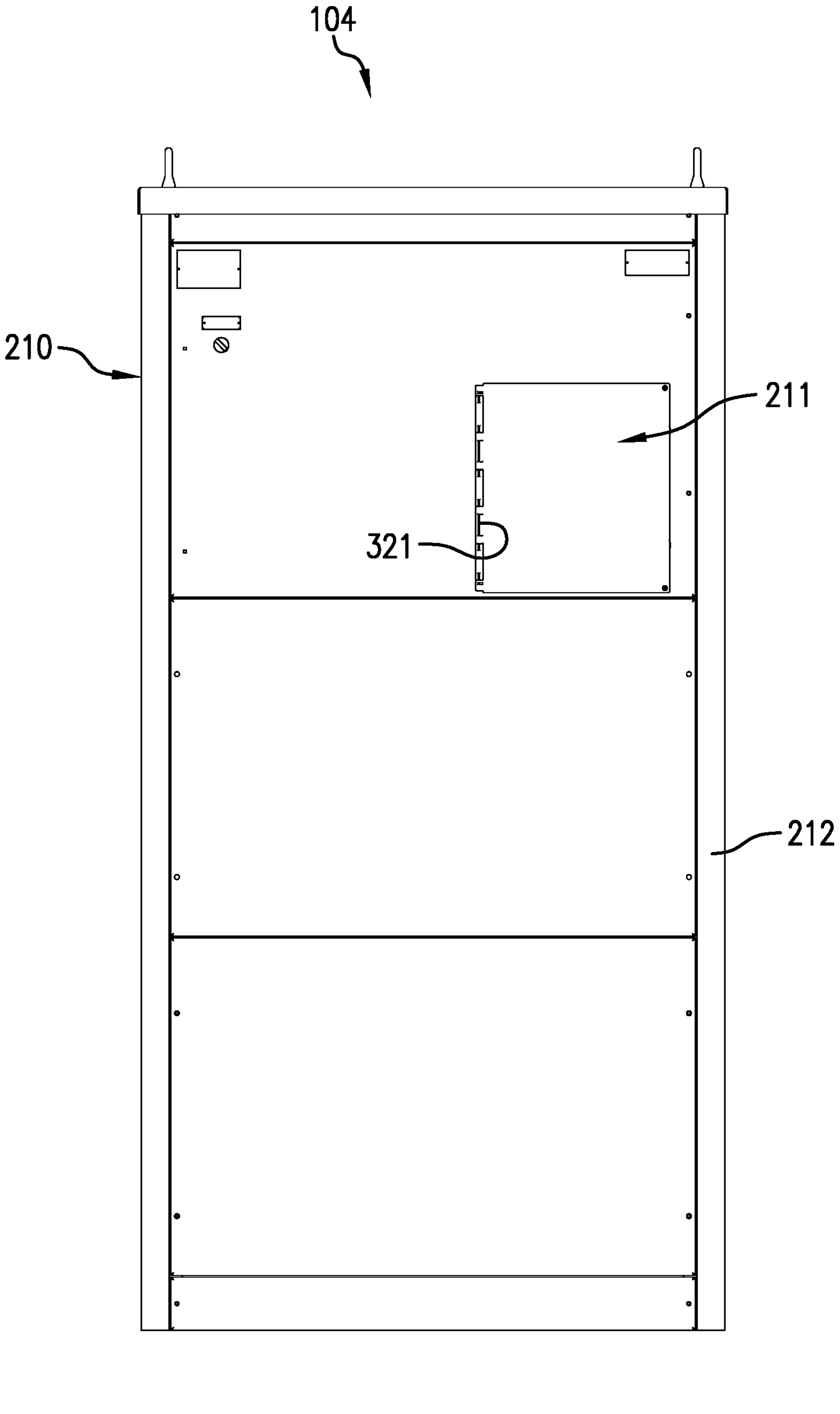
FIG. 3 is a front view of the circuit breaker cabinet of FIG. 1, in accordance with an exemplary embodiment of the present invention.

Referring now to FIG. 3, there is shown a front view of circuit breaker cabinet 104. Cabinet 104 is shown to include frame 212, indicia 214, panels 213*a-c*, and circuit breaker device 211. Further, circuit breaker device 211 can include a handle 321 configured for opening the front end/face cover of circuit breaker device 211 or otherwise for manipulating circuit breaker device 211.

Figure 4:
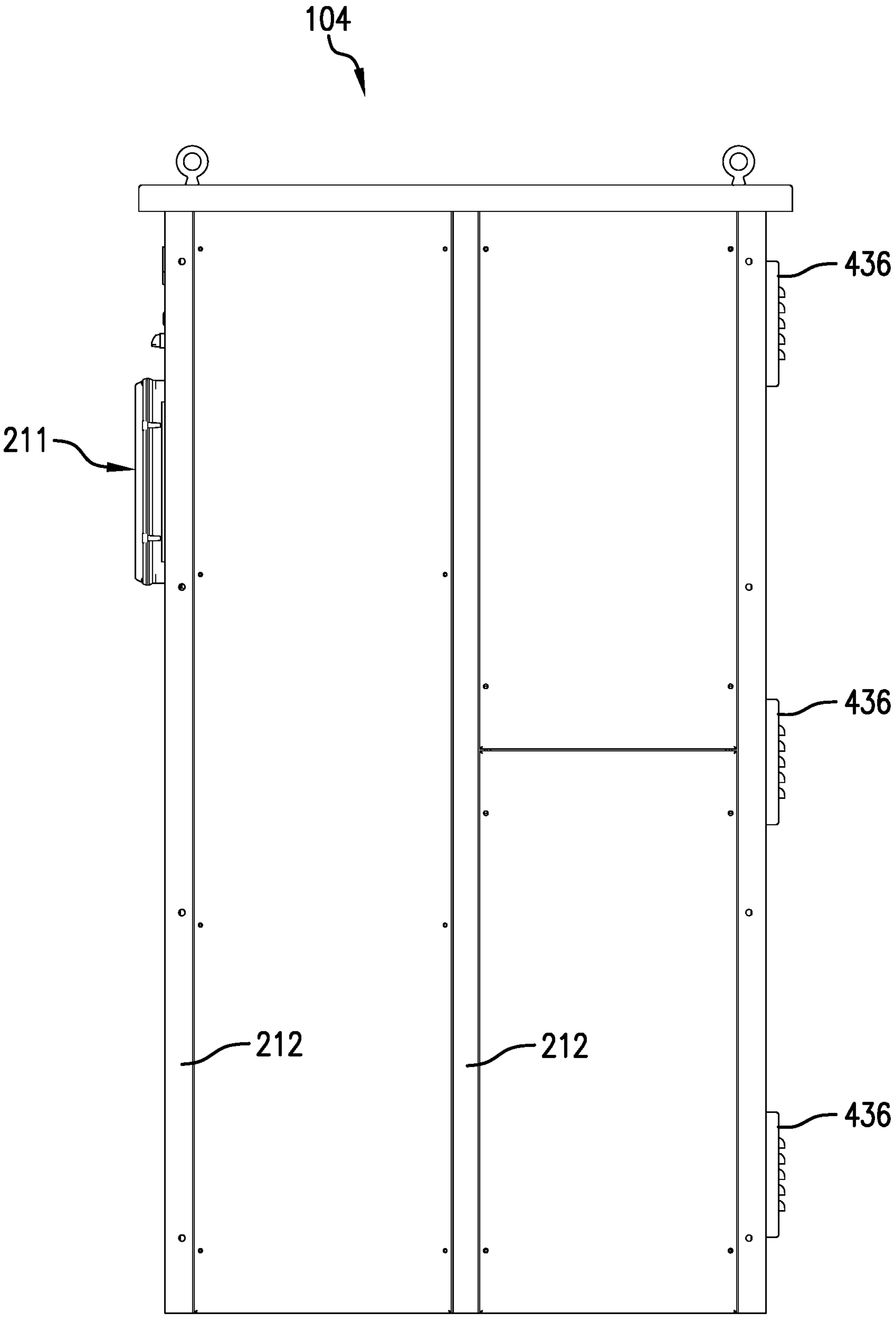
FIG. 4 is a right side view of the circuit breaker cabinet of FIG. 1, in accordance with an exemplary embodiment of the present invention.

Referring now to FIG. 4, there is shown a right side view of circuit breaker cabinet 104 (as viewed in FIG. 2). Cabinet 104 is shown to include frame 212, panels 213*d*, 213*e*, 213*f*, and circuit breaker device 211.

Referring now to FIG. 5, there is shown another front view of circuit breaker cabinet 104, but with panels 213*a*, 213*b*, 213*c* removed, as well as any front end/face cover of circuit breaker device 211. The removal of these structures renders visible user interface 519 of circuit breaker device 211, as well as at least portions of an electrical connector apparatus 522 of cabinet 104. That is, circuit breaker cabinet 104 further includes electrical connector apparatus 522, which is spaced apart from and positioned vertically below circuit breaker device 211, according to an embodiment of the present invention. Circuit breaker device 211 includes a front end 518 which includes user interface 519, which projects in forward direction 220 of cabinet 104; that is, front end 518 includes a front face or front surface which further includes interface 519. User interface 519 is configured for allowing a user to input commands to a controller of or otherwise associated with circuit breaker device 211, for displaying output information to the user, and/or otherwise for manipulating devices, such as switches.

Electrical connector apparatus 522 is coupled with housing 210 by suitable fasteners, such as by way of panel 527, and apparatus 522 is positioned within second region 617. Further, electrical connector apparatus 522 includes a front end 523 which includes a user interface 524 which projects in forward direction 220 of cabinet 104; that is, front end 523 includes a front face or front surface which further includes interface 524. Interface 524 includes a plurality of electrical connectors 525 each of which faces in forward direction 220 (connectors 525 can be referred to, for example, as quick coupling cable receptacles or quick coupling cable receptacle provisions). Electrical connectors 525 can be any suitable electrical connectors configured for allowing an external electrical device 526 to electrically couple with cabinet 104 by way of electrical connector apparatus 522. For example, according to an embodiment of the present invention, each electrical connector 525 can be formed as a camlock electrical connector, such as a female camlock electrical connector which is configured for receiving a mating male electrical connector of electrical cables, for example, which are coupled with external electrical device 526; thus, connectors 525 are configured for electrically coupling with device 526. Camlock connectors 525 can be weatherproofed and include color-coded covers. As shown in FIG. 5, electrical connector apparatus can be a three-phase device and include fourteen camlock connectors 525 per phase (A, B, C), fourteen camlock connectors 525 for neutral, and four camlock connectors 525 for ground, according to one embodiment of the present invention; it can be appreciated that different numbers of connectors 525 can be used within the scope of the present invention. The external electrical device can be, for example, a temporary generator 526 or a load bank 526 (though device 526 is shown electrically coupled by way of a cable with only one connector 525, it can be appreciated that device 526 can be connected with more connectors 525). When device 526 is temporary generator 526, temporary generator 526 can supply electrical power to cabinet 104 in the alternative to generator 103. When device 526 is load bank 526, load bank 526 can be used, for example, as test equipment, simulating an electrical load in the alternative to load 107, in order to test a power source, such as generator 103. Thus, connectors 525 are for temporary electrical connection with device 526, whereas busbars 629*a*, 629*b* (below) are for permanent electrical connection with genset 109 and/or load 107 (except when device 526 temporarily supplants genset 109 and/or load 107). Further, panel 527 can include a label with indica 528. According to an embodiment of the present invention, electrical connector apparatus 522 can be positioned vertically below circuit breaker device 211, and, optionally, mounted coplanar relative to a mounting of circuit breaker device 211 (discussed further below in connection with FIG. 6). Further, the arrangement of electrical connectors 525 shown in FIG. 5 is in accordance with an embodiment of the present invention; but it can be appreciated that other arrangements are within the scope of the present invention (i.e., rather than N-A-B-C left to right, N-A-B-C can be arranged top to bottom).

Indicia 528 can include instructions to the user. These instructions can include, for example, a cable connection sequence for connecting cables of external electrical device 526 with electrical connectors 525. For example, a user may be instructed to make the connections between these cables and connectors 525 in the following order: (1) equipment ground conductor (G); (2) neutral conductor (N); and (3) phase conductors (A-B-C). Further, disconnecting these cables and connectors 525 should be done in the reverse order.

Referring now to FIG. 6, there is shown a right side cross-sectional view of cabinet 104, taken along line 6-6 in FIG. 5. Cabinet 104 is shown in FIG. 6 to include a front portion 630, frame 212, circuit breaker device 211, electrical connector apparatus 522, and a plurality of electrical conductors 629*a*, 629*b*, 629*c*, 629*d*. Front portion 630 includes first region 616 and second region 617, such that user interfaces 519, 524 are each configured for being accessible by a user positioned in front of circuit breaker cabinet 104.

Conductors 629*a-d* can each be formed as any suitable type of electrical conductor and each can be a single conductor or a plurality of conductors; for instance conductors 629*a*, 629*b*, 629*c*, and/or 629*d* can each be formed as a busbar. Conductor 629*a* electrically connects with circuit breaker device 211 at one end of conductor 629*a* and with a plurality of electrical conductors 631 at an opposing end of conductor 629*a*, wherein conductors 631 extend outwardly from cabinet 104 (such as by way of hole 633) to generator 103 (which can be referred to as an alternator), so that device 211 electrically interconnects with generator 103; in this way, conductor 629*a* (a line busbar 629*a*) is an electrical input conductor, and conductors 631 (line conductors 631) are electrical input conductors as well. Conductor 629*b* electrically connects with circuit breaker device 211 at one end of conductor 629*b* and with a plurality of electrical conductors 632 at an opposing end of conductor 629*b*, wherein conductors 632 extend outwardly from cabinet 104 (such as by way of hole 634) to electrical load 107, so that device 211 electrically interconnects with load 107; in this way, conductor 629*b* (a load busbar 629*b*) is an electrical output conductor, and conductors 632 (load conductors 632) are electrical output conductors as well. Conductors 629*a*, 629*b* thus are each electrically connected to and extend rearwardly of circuit breaker device 211, conductor 629*a* being configured for carrying an input current (line current), conductor 629*b* being configured for carrying an output current (load current). Conductor 629*a* is attached to line conductors 631, and conductor 629*b* is attached to load conductors 632. Further, both conductors 629*a*, 629*b* can be mounted at their left ends to circuit breaker device 211 substantially in the same plane, as indicated in FIG. 6. Further, as seen in FIG. 6, conductor 629*b* is positioned above conductor 629*a*, and conductor 629*a* extends farther rearwardly of circuit breaker device 211 than does conductor 629*b*. Because conductor 629*a* extends farther rearwardly than conductor 629*b* and conductor 629*b* is positioned above conductor 629*a*, advantageously input conductors (i.e., conductors 632) can enter cabinet 104 through the top of cabinet 104 and not be blocked or otherwise hindered by conductor 629*b* in reaching (and thereby attaching to) conductor 629*a*. In contrast, a prior art circuit breaker cabinet device is known in which a first busbar of the circuit breaker device is positioned above a second busbar of the circuit breaker device; but, because of the length of the first bar relative to the second busbar (the first busbar is too long), the first busbar would block or otherwise hinder conductors entering the top of the cabinet in reaching the second busbar.

Conductor 629*c* interconnects with electrical connectors 525 and conductor 629*d*, so as to electrically interconnects electrical connectors 525 and conductor 629*d*. Conductor 629*d* electrically connects with conductors 629*a* and/or 629*b*, so as to electrically interconnect connectors 525 with circuit breaker device 211 when using device 526 (either as a temporary generator 526 or a load bank 526). As shown in FIG. 6, each of conductors 629*a*, 629*b*, 629*c*, 629*d* is positioned at least partially rearwardly of each of circuit breaker device 211 and electrical connector apparatus 522.

Further, though not specifically shown, cabinet 104 incudes a rear side and a bottom side. The rear side can include a single panel (or, alternatively, a plurality of panels) with louvered vents 436 (as indicated in in FIG. 4). Further, the bottom side can optionally include a panel (bottom panel), such as a flat panel, which is attached to frame 212. This bottom panel can close the bottom of cabinet 104 and can be similar to panel 213*g* (whether or not of the same dimensions), except that this bottom panel may include a hole 635 (conductor routing or mounting channel) corresponding to hole 634 but not a hole corresponding to hole 633. As seen in FIG. 6, hole 635 is substantially opposite to hole 634. Hole 635 can optionally be rectangular and substantially mirror hole 633. Hole 635 can optionally accommodate therethrough load electrical conductors (i.e., load conductors extending between circuit breaker device 211 and load 107, similar to load conductors 632), in addition or in the alternative to load conductors 632 extending through hole 634.

Further, according to an optional embodiment of the present invention, circuit breaker device 211 and electrical connector apparatus 522 are mounted substantially coplanar relative to one another. That is, cabinet 104 includes a mounting structure 637 (which can include a plurality of structures and can be the same as or include internal panel 527) that occupies substantially a single vertical plane 637*a* (which faces forward, like internal panel 527). Mounting structure 637 can include a wall, such as a wooden or metal wall. Plane 637*a* faces forward and extends toward the viewer of FIG. 6.

Further, at a suitable location on cabinet 104, a label may be placed to instruct a user how to connect, for example, temporary generator 526 with cabinet 104 and thus with circuit breaker device 211, which can be referred to as a key interlock sequence for temporary generator 526. Any suitable key interlock sequence may be used; one embodiment of such a sequence is provided here, by way of example. Thus, to make this connection (between temporary generator 526 with cabinet 104) and thereby to access temporary generator 526, the following instructions may be provided to user: (1) open generator 103 with a breaker control switch of circuit breaker device 211; (2) turn and remove a key from a panel mounted interlock switch; (3) insert the key into a key interlock on panel 213*b* and/or 213*c* (which may be formed as a door to be opened by the key) to access electrical connectors 525 (which may be deemed, in this example, to be temporary generator connections), and the key will be held captive while panel 213*b* and/or 213*c* (which can be referred to as the temporary generator door(s)) is open. Further, to return cabin 104 back to normal generator operations (using generator 103 and no longer temporary generator 526), the following instructions may be provided to user: (1) remove all electrical cables from electrical connectors 525 and thus from a compartment of cabinet 104 that is occupied by electrical connector apparatus 522 (which can be deemed to be the temporary generator connection compartment), and ensure no other electrical connectors are present and connected with connectors 525); (2) close panels 213*b* and/or 213*c* (which may be referred to as temporary generator doors, though panels 231*b* and 213*c* may optionally form a single such door), and lock panels 213*b* and/or 213*c* using the key interlock; (3) remove the key from the lock, and insert it in the panel mounted lock; (4) turn the key so the key cannot be removed, which will allow the breaker control switch to close the breaker 211; (5) close the generator breaker (with respect to generator 103) with breaker 211 control switch. Further, according to an embodiment of the present invention, turning the key interlock at anytime to remove the key will trip the generator breaker (that is, breaker 211). It can be appreciated that the scope of the present invention may altogether exclude an keyed interlock locations and sequence to be used therewith (keyed interlocks are not a requirement on every cabinet 104) or may use any suitable keyed interlock locations and sequence, which optionally can be added and defined by a user downstream of manufacturing cabinet 104.

In use, cabinet 104 can be installed in genset system 100 and electrically interconnected with generator 103 and electrical load 107, such that circuit breaker device 211 is electrically interconnected therebetween. When, for example, a user wishes to interconnect temporary generator 526 with cabinet 104, this is accomplished by opening the electrical connection with generator 103 and connecting electrical cables of temporary generator 526 with electrical connectors 525. A similar process can be used if external electrical device 526 is load bank 526, except that load 107 is disconnected from cabinet 104 using circuit breaker device 211, rather than generator 103. Finally, external electrical device 526 can be disconnected from electrical connectors 525 of electrical connector apparatus 522.

Figure 7:
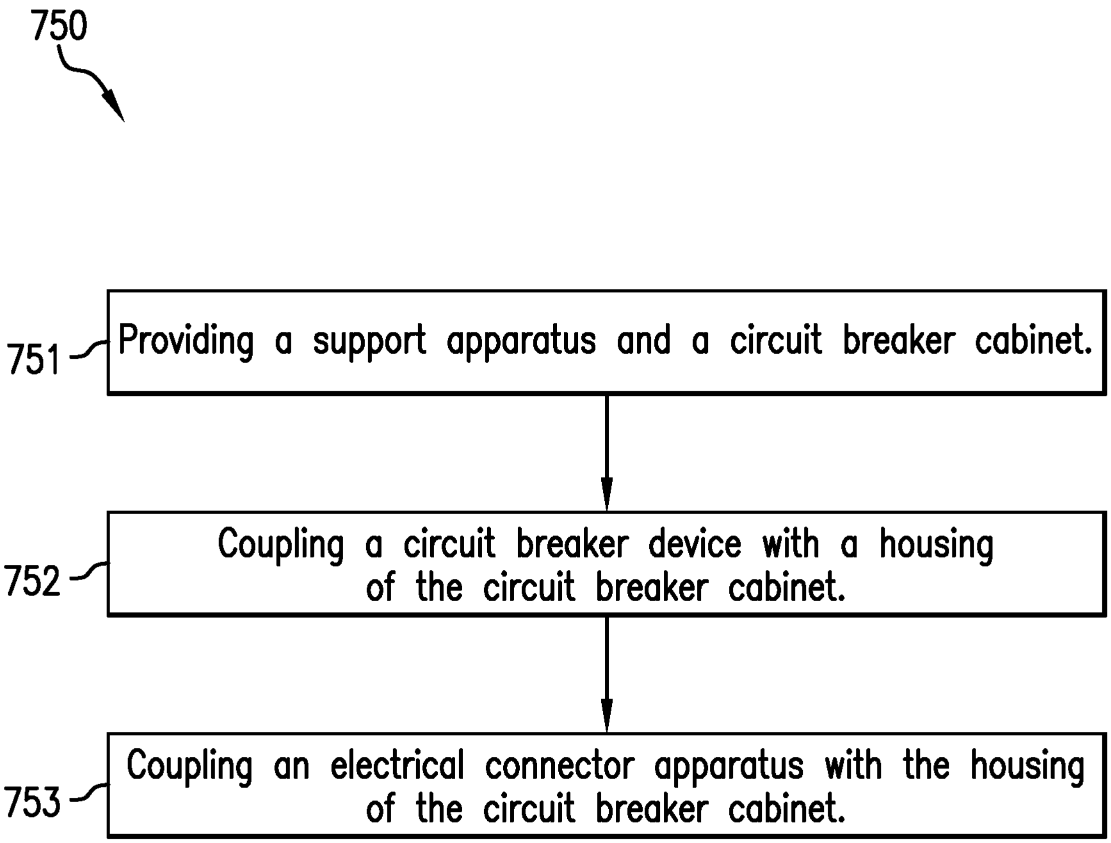
FIG. 7 is a flow diagram showing a method of using the generator set system of FIG. 1, in accordance with an exemplary embodiment of the present invention.

Referring now to FIG. 7, there is shown a flow diagram of a method 750 of using generator set system 100. Method 750 includes the steps of: providing 751 support apparatus

101 and circuit breaker cabinet 104 coupled with support apparatus 101, circuit breaker cabinet 104 including housing 210, circuit breaker device 211, and electrical connector apparatus 522, housing 210 including first region 616 and second region 617 which is spatially separated from first region 616; coupling 752 circuit breaker device 211 with housing 210, circuit breaker device 211 being within first region 616 and including front end 518 with user interface 519; and coupling 753 electrical connector apparatus 522 with housing 210, electrical connector apparatus 522 being within second region 617 and including front end 523 with user interface 524. Generator set system can further include generator 103 which is selectively electrically coupled with circuit breaker cabinet 104, which includes at least one electrical conductor 629*a*, 629*b*, 629*c*, 629*d* which electrically connects circuit breaker device 211 and electrical connector apparatus 522. User interface 524 of electrical connector apparatus 522 can include electrical connectors 525 each of which faces in a forward direction 220 of circuit breaker cabinet 104. Circuit breaker cabinet 104 can include front portion 630 which includes first region 617 and second region 618, such that user interface 519 of circuit breaker device 211 and user interface 524 of electrical connector apparatus 522 are each configured for being accessible by a user positioned in front of circuit breaker cabinet 104. Electrical connectors 525 are camlock electrical connectors 525 configured for electrically coupling with temporary generator 526 or load bank 526. The at least one electrical conductor 629*a*, 629*b*, 629*c*, 629*d* is positioned at least partially rearwardly of each of circuit breaker device 211 and electrical connector apparatus 522. Circuit breaker device 211 and electrical connector apparatus 522 are mounted substantially coplanar relative to one another. Circuit breaker cabinet 104 includes a first busbar 629*a*, a second busbar 629*b*, a plurality of line conductors 631, and a plurality of load conductors 632, first busbar 629*a* and second busbar 629*b* each being electrically connected to and extending rearwardly of circuit breaker device 211, first busbar 629*a* extending farther rearwardly of circuit breaker device 211 than second busbar 629*b*, second busbar 629*b* being positioned above first busbar 629*a*, first busbar 629*a* being attached to the plurality of line conductors 631, second busbar 629*b* being attached to the plurality of load conductors 632.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A generator set system, comprising:

a support apparatus;

a circuit breaker cabinet coupled with the support apparatus, the circuit breaker cabinet including:

a housing including a first region and a second region which is spatially separated from the first region;

a circuit breaker device coupled with the housing, being within the first region, and including a front end with a user interface; and an electrical connector apparatus coupled with the housing, being within the second region, and including a front end with a user interface, the user interface of the electrical connector apparatus includes a plurality of electrical connectors that are each configured for directly coupling with a mating electrical connector of a cable which is external to the circuit breaker cabinet.

2. The generator set system of claim 1, further comprising a generator which is selectively electrically coupled with the circuit breaker cabinet, which includes at least one electrical conductor which electrically connects the circuit breaker device and the electrical connector apparatus.

3. The generator set system of claim 2, wherein each of the plurality of electrical connectors faces in a forward direction of the circuit breaker cabinet.

4. The generator set system of claim 3, wherein the circuit breaker cabinet includes a front portion which includes the first region and the second region, such that the user interface of the circuit breaker device and the user interface of the electrical connector apparatus are each configured for being accessible by a user positioned in front of the circuit breaker cabinet, the plurality of electrical connectors being a plurality of camlock electrical connectors configured for electrically coupling with a temporary generator or a load bank, the at least one electrical conductor being positioned at least partially rearwardly of each of the circuit breaker device and the electrical connector apparatus.

5. The generator set system of claim 3, wherein the circuit breaker device and the electrical connector apparatus are mounted substantially coplanar relative to one another.

6. The generator set system of claim 3, wherein the circuit breaker cabinet includes a first busbar, a second busbar, a plurality of line conductors, and a plurality of load conductors, the first busbar and the second busbar each being electrically connected to and extending rearwardly of the circuit breaker device, the first busbar extending farther rearwardly of the circuit breaker device than the second busbar, the second busbar being positioned above the first busbar, the first busbar being attached to the plurality of line conductors, the second busbar being attached to the plurality of load conductors.

7. A circuit breaker cabinet for a generator set system, the generator set system including a support apparatus, the circuit breaker cabinet being coupled with the support apparatus, the circuit breaker cabinet comprising:

a housing including a first region and a second region which is spatially separated from the first region;

a circuit breaker device coupled with the housing, being within the first region, and including a front end with a user interface; and an electrical connector apparatus coupled with the housing, being within the second region, and including a front end with a user interface, the user interface of the electrical connector apparatus includes a plurality of electrical connectors that are each configured for directly coupling with a mating electrical connector of a cable which is external to the circuit breaker cabinet.

8. The circuit breaker cabinet of claim 7, wherein the circuit breaker cabinet is configured for being selectively electrically coupled with a generator of the generator set system, the circuit breaker cabinet including at least one electrical conductor which electrically connects the circuit breaker device and the electrical connector apparatus.

9. The circuit breaker cabinet of claim 8, wherein each of the plurality of electrical connectors faces in a forward direction of the circuit breaker cabinet.

10. The circuit breaker cabinet of claim 9, wherein the circuit breaker cabinet includes a front portion which includes the first region and the second region, such that the user interface of the circuit breaker device and the user interface of the electrical connector apparatus are each configured for being accessible by a user positioned in front of the circuit breaker cabinet, the plurality of electrical connectors being a plurality of camlock electrical connectors configured for electrically coupling with a temporary generator or a load bank, the at least one electrical conductor being positioned at least partially rearwardly of each of the circuit breaker device and the electrical connector apparatus.

11. The circuit breaker cabinet of claim 9, wherein the circuit breaker device and the electrical connector apparatus are mounted substantially coplanar relative to one another.

12. The circuit breaker cabinet of claim 9, wherein the circuit breaker cabinet includes a first busbar, a second busbar, a plurality of line conductors, and a plurality of load conductors, the first busbar and the second busbar each being electrically connected to and extending rearwardly of the circuit breaker device, the first busbar extending farther rearwardly of the circuit breaker device than the second busbar, the second busbar being positioned above the first busbar, the first busbar being attached to the plurality of line conductors, the second busbar being attached to the plurality of load conductors.

13. A method of using a generator set system, the method comprising the steps of:

providing a support apparatus and a circuit breaker cabinet coupled with the support apparatus, the circuit breaker cabinet including a housing, a circuit breaker device, and an electrical connector apparatus, the housing including a first region and a second region which is spatially separated from the first region;

coupling the circuit breaker device with the housing, the circuit breaker device being within the first region and including a front end with a user interface; and coupling the electrical connector apparatus with the housing, the electrical connector apparatus being within the second region and including a front end with a user interface, the user interface of the electrical connector apparatus includes a plurality of electrical connectors that are each configured for directly coupling with a mating electrical connector of a cable which is external to the circuit breaker cabinet.

14. The method of claim 13, wherein the generator set system further includes a generator which is selectively electrically coupled with the circuit breaker cabinet, which includes at least one electrical conductor which electrically connects the circuit breaker device and the electrical connector apparatus.

15. The method of claim 14, wherein each of the plurality of electrical connectors faces in a forward direction of the circuit breaker cabinet.

16. The method of claim 15, wherein the circuit breaker cabinet includes a front portion which includes the first region and the second region, such that the user interface of the circuit breaker device and the user interface of the electrical connector apparatus are each configured for being accessible by a user positioned in front of the circuit breaker cabinet, the plurality of electrical connectors being a plurality of camlock electrical connectors configured for electrically coupling with a temporary generator or a load bank, the at least one electrical conductor being positioned at least partially rearwardly of each of the circuit breaker device and the electrical connector apparatus.

17. The method of claim 15, wherein the circuit breaker device and the electrical connector apparatus are mounted substantially coplanar relative to one another.

18. The method of claim 15, wherein the circuit breaker cabinet includes a first busbar, a second busbar, a plurality of line conductors, and a plurality of load conductors, the first busbar and the second busbar each being electrically connected to and extending rearwardly of the circuit breaker device, the first busbar extending farther rearwardly of the circuit breaker device than the second busbar, the second busbar being positioned above the first busbar, the first busbar being attached to the plurality of line conductors, the second busbar being attached to the plurality of load conductors.

* * * * *